United States Patent

Takeuchi

Patent Number: 6,026,351
Date of Patent: Feb. 15, 2000

[54] METHOD AND APPARATUS FOR MEASURING THE DIMENSIONS OF SHEET METAL PARTS, AND A SHEET METAL PROCESSING SYSTEM WHICH UTILIZES SUCH MEASURING METHOD AND APPARATUS

[75] Inventor: Shunsuke Takeuchi, Tokyo, Japan

[73] Assignee: Amada Company, Limited, Kanagawa, Japan

[21] Appl. No.: 08/966,585

[22] Filed: Nov. 10, 1997

[30] Foreign Application Priority Data

Nov. 11, 1996 [JP] Japan ................................... 8-298911

[51] Int. Cl.[7] ..................................................... G01B 7/03
[52] U.S. Cl. .......................... 702/155; 702/187; 702/188;
364/468.01; 364/468.25; 364/474.26; 364/474.36; 33/503
[58] Field of Search .................................... 702/155, 187,
702/188; 364/474.35, 468.01, 474.01, 474.37,
468.24, 468.25, 468.26, 474.07, 474.36,
474.26; 33/503

[56] References Cited

U.S. PATENT DOCUMENTS

| | | | |
|---|---|---|---|
| 3,936,665 | 2/1976 | Donoghue | 364/471.03 |
| 4,586,150 | 4/1986 | Budziak et al. | 702/164 |
| 4,677,755 | 7/1987 | Iwano et al. | 33/503 |
| 5,008,665 | 4/1991 | Wakatsuki et al. | 340/870.26 |
| 5,136,285 | 8/1992 | Okuyama | 702/187 |
| 5,231,675 | 7/1993 | Sarr et al. | 382/152 |
| 5,329,597 | 7/1994 | Kouno et al. | |
| 5,359,872 | 11/1994 | Nashiki | 72/16.1 |
| 5,402,364 | 3/1995 | Kitoh et al. | 702/167 |
| 5,485,560 | 1/1996 | Ishida et al. | 395/133 |

FOREIGN PATENT DOCUMENTS 4-164550  6/1992  Japan .

OTHER PUBLICATIONS

A English Language Abstract of JP 4–164550.

*Primary Examiner*—Marc S. Hoff
*Assistant Examiner*—Hien Vo
*Attorney, Agent, or Firm*—Greenblum & Bernstein, P.L.C.

[57] ABSTRACT

A sheet metal processing system is provided that includes a first sheet metal processing machine, a first sheet metal processing machine terminal for controlling the operations of the first sheet metal processing machine, a first measuring apparatus for measuring the dimensions of a product or part processed by the first sheet metal processing machine, a second sheet metal processing machine, a second sheet metal processing machine terminal for controlling the operations of the second sheet metal processing machine, and a second measuring apparatus for measuring the dimensions of a product or part processed by the second sheet metal processing machine. Each terminal includes a display apparatus for displaying the sites of the part to be measured by each measuring apparatus. Each measuring apparatus includes a transmitter for transmitting the measured dimensions of the part to a receiver provided in each terminal.

14 Claims, 9 Drawing Sheets

METHOD AND APPARATUS FOR MEASURING THE DIMENSIONS OF SHEET METAL PARTS, AND A SHEET METAL PROCESSING SYSTEM WHICH UTILIZES SUCH MEASURING METHOD AND APPARATUS

BACKGROUND OF THE INVENTION

1. Field of the Invention

The present intention relates to method and apparatus for measuring various dimensions of parts or products manufactured with a sheet metal machine tool or unit. Further, the present invention relates to a sheet metal processing system which uses such measuring method and apparatus.

2. The Prior Art

Up to now, an in-plant worker or inspector would use a measuring device, such as calipers, a micrometer, a protractor or a three-dimensional measuring device, to measure various sites or portions of a product or part manufactured with a sheet metal machine tool, in order to determine whether or not the manufactured product or part was manufactured in accordance with prescribed specifications.

Now, when such measurements are to be carried out, the worker or inspector must determine the specific sites or dimensions to be measured based on instructions and drawings in a job instruction manual. However, because a considerable amount of experience is required to appropriately determine such measurement sites or dimensions, an inexperienced worker is likely to make mistakes. Furthermore, when carrying out measurements, an inexperienced worker may choose the wrong measuring device. Moreover, even if the correct measuring device is selected, an inexperienced worker may use such measuring device incorrectly (e.g., improper placement of the protractor on the manufactured product being inspected).

Furthermore, because the measurement data and results must be entered in a book with hand when using measuring devices in accordance with prior art methods, the handwriting process is very time-consuming and susceptible to errors (e.g., an incorrect entry in the book). Moreover, because a considerable amount of experience is required in order to judge whether or not a manufactured product or part is acceptable based on such measurement data, an experienced worker will have difficulty in determining the acceptability of a manufactured product or part. In this connection, because the technical level of in-plant worker is becoming more diversified, there is an increasing chance of errors occurring due to inexperienced workers being required to perform inspection of manufactured products or parts.

JP 4-164550A discloses a method in which dimensions of the product or part manufactured by a machine tool are measured by a measuring device, and the measured dimensions are sent to an NC device. In the NC device, the data is used to evaluate the quality of the products and to revise the NC data if the quality is unsatisfactory. Even in this method, it is still difficult for the worker or inspector to determine the appropriate specific sites or dimensions of the product or part to be measured.

SUMMARY OF THE INVENTION

It is an object of the present invention to overcome the problems of the prior art discussed above.

In order to achieve this object, in the measurement apparatus and method of measuring dimensions of a sheet metal product according to the present invention, the sites or dimensions of a sheet metal product or part to be measured are displayed on a display apparatus to enable such sites or dimensions to be selected for measurement by a worker or operator. In this way, it is possible for even an inexperienced worker or operator to easily select the appropriate sites for measurement.

Further, in the measurement apparatus and measuring method of the present invention, the measurement values measured for a sheet metal product are sent from a prescribed measuring device to a prescribed computer via a communication means. In this way, it is possible to have the measurement data and measurement results automatically stored in an appropriate memory, thereby making it possible to easily and quickly store such information. Furthermore, this arrangement eliminates the risk of a worker incorrectly recording measurement data.

Further, a sheet metal processing system in accordance with the another feature of the present invention includes sheet metal processing machines (sheet metal machine tools), sheet metal processing machine terminal computers (hereafter referred to as "sheet metal processing machine terminals") for controlling the operations of the sheet metal processing machines, measuring apparatus for measuring the dimensions of a product that has been processed with the sheet metal processing machines, a transmitter provided in the measuring apparatus, for transmitting the dimensions measured by the measuring apparatus, and a receiver provided in the( terminal, for receiving the dimensions from the transmitter. In this way, the processing system of the present invention makes it possible to automatically store the obtained measurement data and measurement results in an appropriate memory without the risk of mistakes.

In this connection, it is preferred that the display device be capable of displaying desirable measurement sites and desirable measuring apparatuses. In this way, it becomes easy for even an inexperienced worker to select the proper measurement sites and use the correct measuring device.

Further, it is preferred that the terminals be equipped with a comparing device to compare the measured values with reference values.

Moreover, the terminals should preferably be able to output instructions to correct the NC data of the sheet metal processing machines when it is determined that the measurement data exceeds the limits defined by prescribed allowable errors. In this way, by having an arrangement which automatically determines whether or not the measurement data lies within the limits defined by the allowable errors, the measurement system can automatically determine whether or not an inspected product is acceptable.

Further, it is preferred that the terminals be equipped with conversion means and/or conversion software to enable practical measurement values to be converted into theoretical measurement values. For example, in the case where the spacing between holes are to be measured with respect to the centers of such holes, it is easier to measure such spacing with respect to the edges of the holes and then convert such measurements (with a conversion device or conversion software) into measurements corresponding to the spacing of the holes with respect to the centers of such holes. On this way, it is possible to simplify complicated or difficult measurements.

Further, it is preferred that the terminals be provided with means for automatically selecting appropriate measurement sites as well as means for manually selecting appropriate measurement sites.

Further, it is preferred that the measurement apparatus be provided with mechanical measuring devices such as calipers, micrometers and the like.

Now, a sheet metal processing system in accordance with a another feature of the present invention comprises a first sheet metal processing machine, a first sheet metal processing machine terminal for controlling the operations of the first sheet metal processing machine, a first measuring apparatus for measuring the dimensions of a product processed by the first sheet meta processing machine, a second sheet metal processing machine, a second sheet metal processing machine terminal for controlling the operations of the second sheet metal processing machine, a second measuring apparatus for measuring the dimensions of a product processed by the second sheet metal processing machine, wherein each of the measuring apparatuses includes an output device for outputting measured dimensions and each of the terminal includes a device for receiving the measured dimensions sent from the output means, and the system includes a data control computer for receiving the measurement data from each of the first and second terminals and collectively managing such data.

With this arrangement, it is possible to collectively manage the measurement data of products processed by a plurality of sheet metal processing machines. For example, it is possible to correct the NC data for the punching machine by referring to data or dimensions of the products processed by the bending machine as well as the punching machine.

DETAILED DESCRIPTION OF THE PREFERRED EMBODIMENTS

Figure 1:
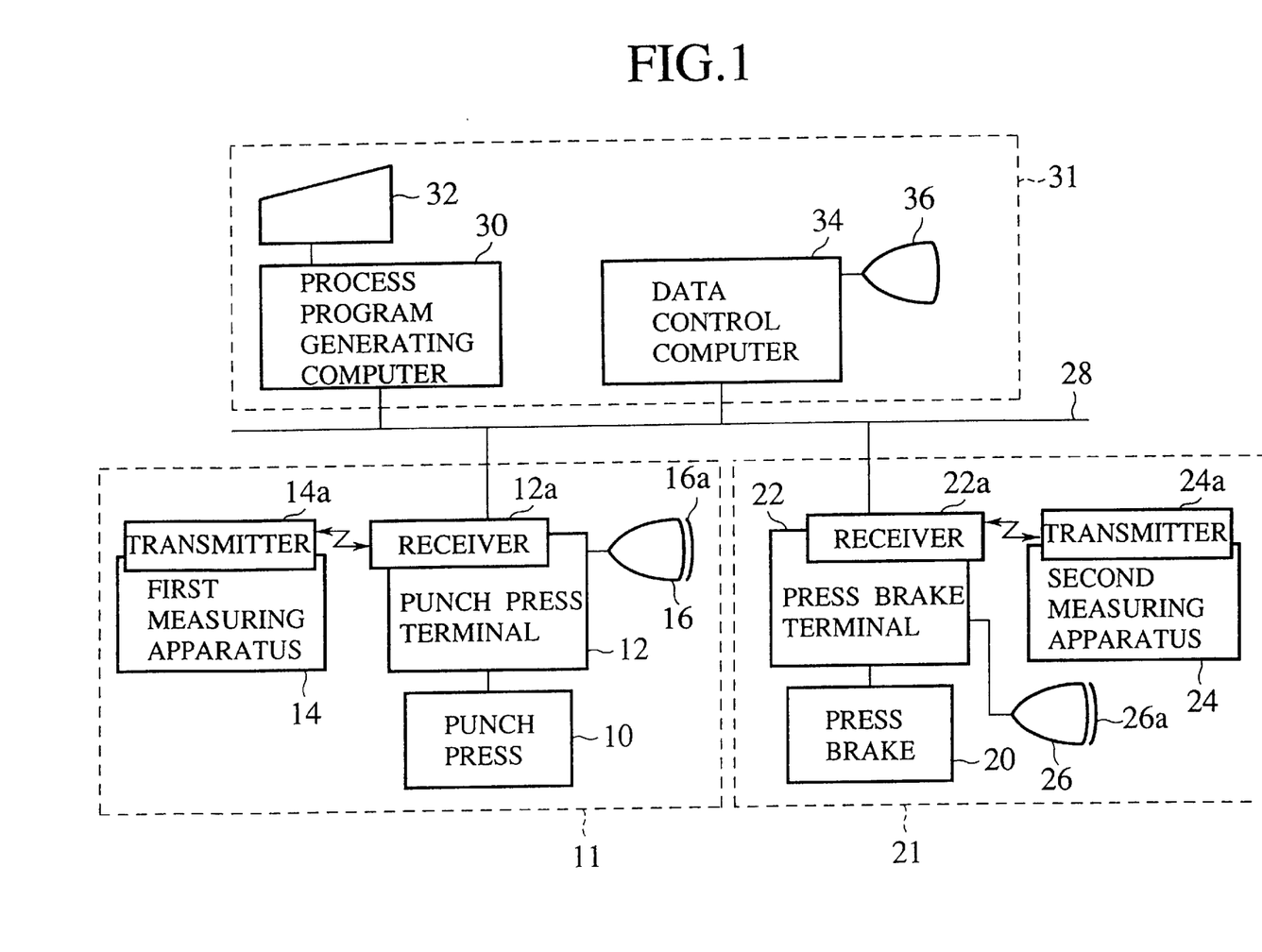
FIG. 1 is a block diagram of an embodiment of sheet metal processing system according to the present invention.

A detailed description of an exemplary embodiment of a sheet metal processing system according to the present invention will now be given with reference to the drawings. In this connection, FIG. 1 is a block diagram of the embodiment of the present invention. As shown in this block diagram, the sheet metal processing system includes a punching process station 11, a bending process station 21 and a control room 31.

The punching process station 11 is provided with a punch press 10 which functions as a sheet metal processing machine or a sheet metal machine tool to punch holes into a workpiece comprised of sheet metal. The punch press 10 is connected to a punch press computer terminal 12 (hereafter referred to as "terminal 12") which is provided to numerically control the operation of the punch press 10. The terminal 12 is provided with a receiver (or receiving device) 12a to receive data from a measuring apparatus (described below).

Figure 4:
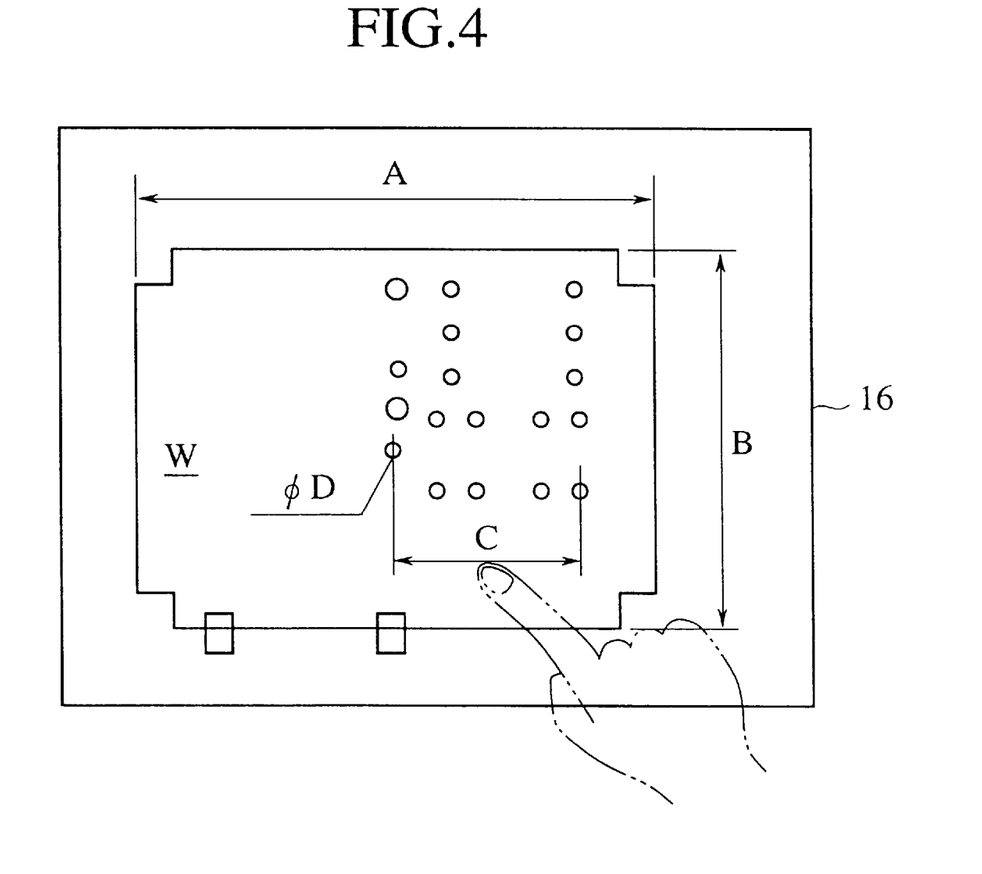
FIG. 4 is an expiratory drawing showing the display screen of a punch press terminal computer.
Figure 5:
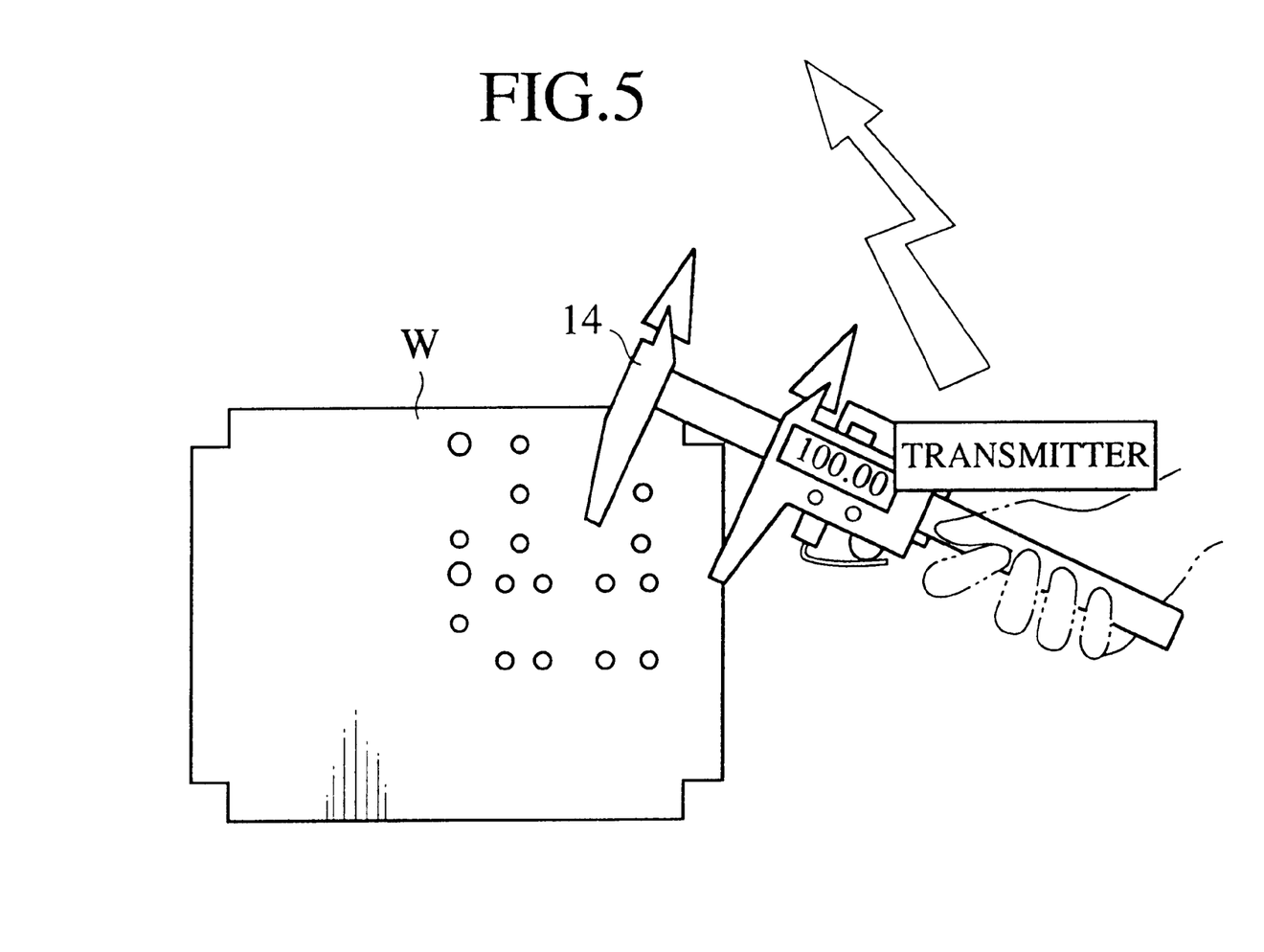
FIG. 5 is an explanatory drawing showing how a measurement is carried out for measuring dimensions of a product which has undergone a punching process.
Figure 9:
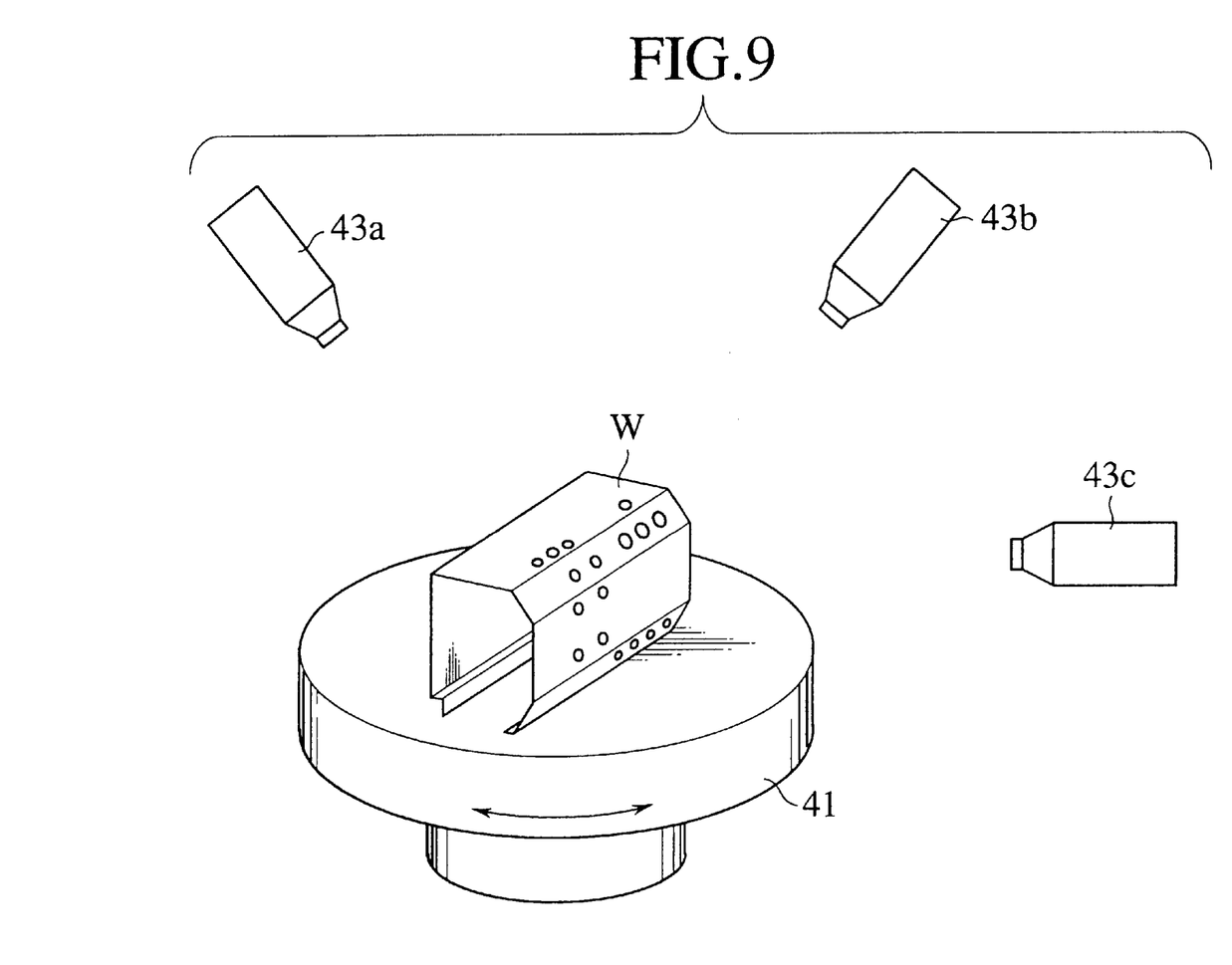
FIG. 9 is a schematic view showing a non-contact type three-dimensional measuring device which can be used in the measuring system according to the present invention.

The station 11 is provided with a first measuring apparatus 14 for measuring the dimensions of prescribed processed sites of a workpiece which has undergone a punching process by the punch press 10. In this regard, the first measuring apparatus 14 functions as a product inspection apparatus. Namely, the first measuring apparatus 14 includes at least one measuring device, such as calipers, a micrometer, a dial gauge, a protractor, a projector, an electric micrometer, a torque meter or a three-dimensional measuring device (contact type or non-contact type), which, as shown in FIG. 4, is used to measure dimensions such as the side lengths A, B or the hole spacing C and the hole diameter D of a workpiece. In this connection, FIG. 9 shows an example of a non-contact type three-dimensional measuring device which can be used in the present invention. As shown in FIG. 9, the three-dimensional measuring device includes a turntable 41 for supposing a workpiece W and three laser length measuring devices 43a, 43b, 43c arranged in three mutually different directions to obtain length data to be used in calculating the dimensions of workpiece W. Here, image pickup devices, such as CCD cameras can be used in place of the laser length measuring devices.

With reference once again to FIG. 1, the first measuring apparatus 14 is provided with a wireless transmitter (signal transmitting device) 14a to transmit measured data (measurement data) to the signal receiver (receiver) 12a of the terminal 12. In this way, the measurement data from the measuring apparatus 14 is automatically transmitted to the terminal 12 equipped with the receiver 12a. In this connection, it should be noted that it is also possible for the transmitter 14a to use a wire arrangement to transmit measurement data to the signal receiver 12a.

Further, the terminal 12 is connected to a display apparatus 16 to display data and the like stored in the terminal 12, with the display apparatus 16 being provided with a touch screen 16a to enable an operator to input various instructions and commands.

As is further shown in FIG. 1, the bending process station 21 is provided with a press brake 20 which functions as a sheet metal processing machine or a sheet metal machine tool to bend a sheet metal workpiece. The press brake 20 is connected to a press brake computer terminal 22 equipped with a wireless receiver 22a.

Further, a second measuring apparatus 24 is provided to measure a sheet metal product or part which has undergone a bending process, with the second measuring apparatus 24 being equipped with a wireless transmitter 24a. The second measuring apparatus 24 includes a bend angle gauging device 24c for gauging the angle of a bending formed in the part (see FIG. 7) as well as the various measuring devices listed above as an example of the first measuring apparatus 14. In this way, measurement data measured by the second measuring apparatus 24 is sent to the terminal 22 via the Wireless transmitter 24a and the wireless receiver 22a. In this connection, the operation of the second measuring apparatus 24 is roughly the same as those of the first measuring apparatus 14. Further, the terminal 22 is connected to a display apparatus 26 equipped with a touch screen 26a.

Further, the control room 21 is provided with a process program generating computer 30 equipped with an input apparatus 32 and a data control computer (or data managing computer) 34 equipped with a display apparatus 36. The computers 30, 34 are connected to the terminals 12, 22 via an LAN network 28. The data managing computer (or data control computer) 34 is designed to collectively manage or control the measurement data sent from the terminals 12, 22. Further, the process program generating computer 30 is designed to generate NC programs for controlling the operations of the punch press 10 and the press brake 20. These NC programs are sent to the terminals 12, 22 to respectively control the operations of the punch press 10 and the press brake 20. In this connection, it is to be noted that it is possible to omit the data control computer 34 in cases where the scale of the system is small, such as when the only machine tool present is the punch press 10. In such case, the punch press terminal 12 is designed to function as a data control computer as well as an NC control device for controlling the punch press 10.

Next, with reference to the flow charts shown in FIGS. 2 and 3, the operation of the sheet metal processing system according to the disclosed embodiment will be described.

Figure 2:
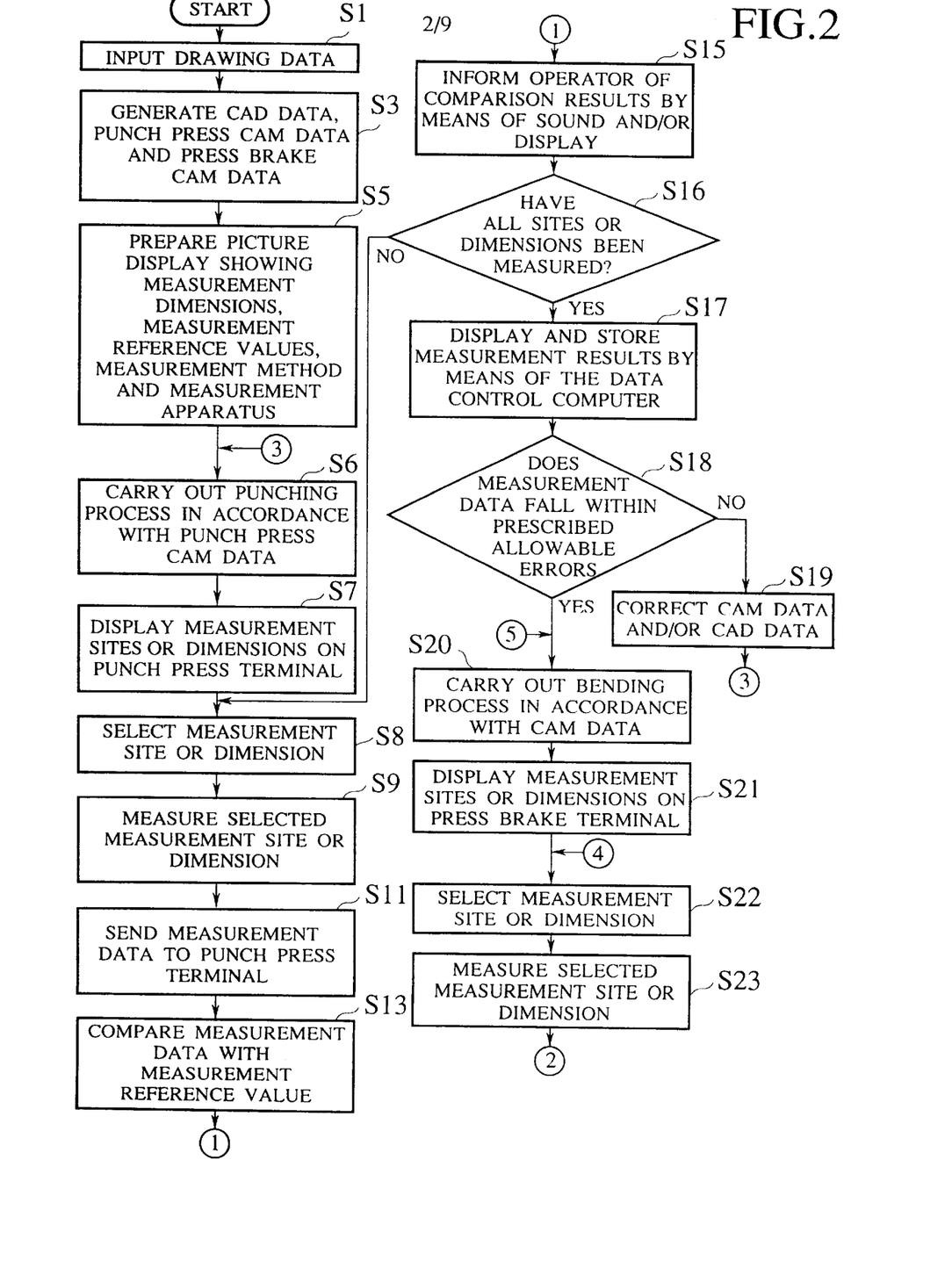
FIGS. 2 and 3 illustrate a flow chart showing the operation of the sheet metal processing system according to the present invention.
Figure 3:
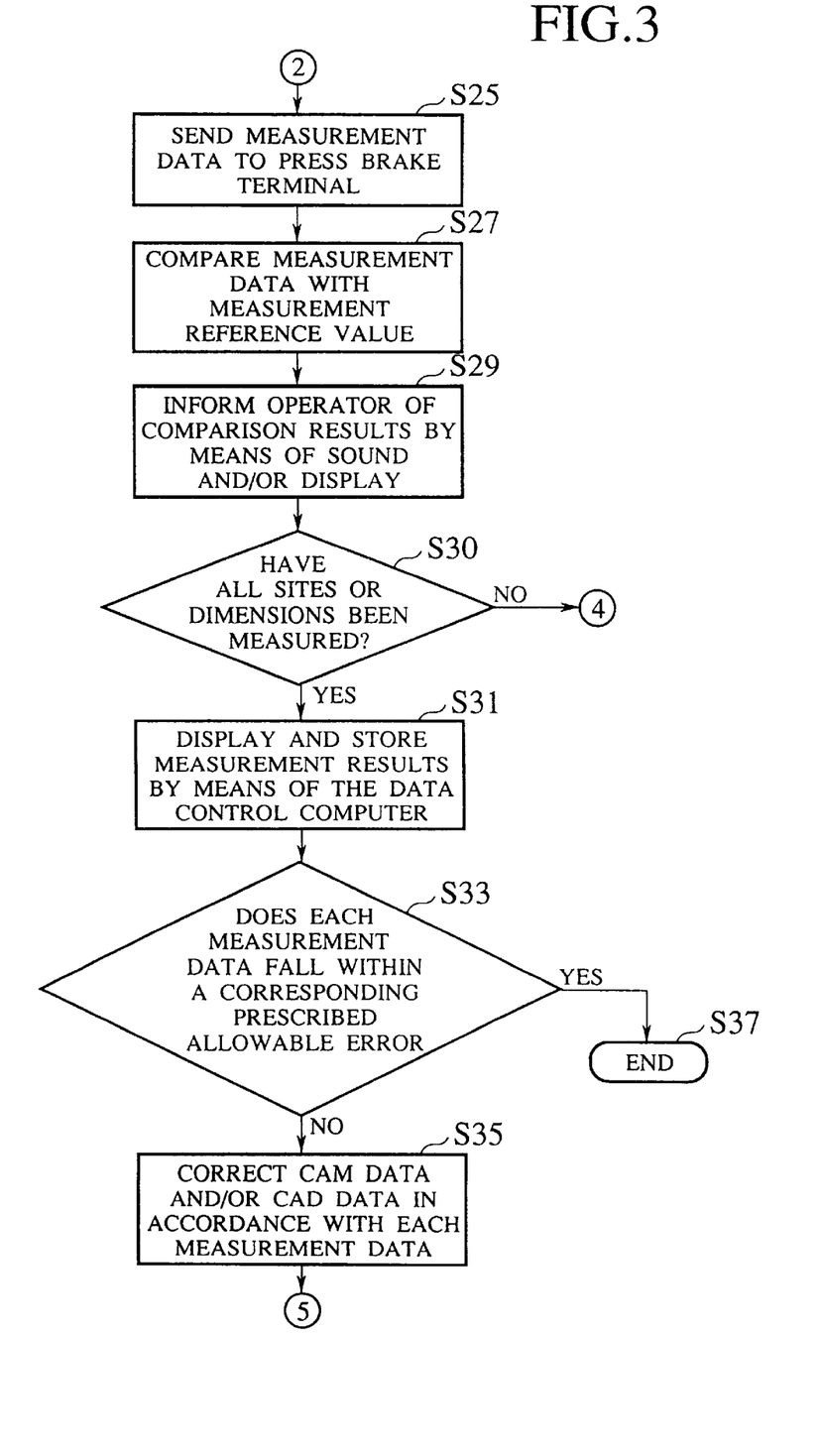

As shown in FIG. 2, at step S1, drawing data (image data) for a sheet metal product is inputted into the process program generating computer 30 by means of the input apparatus 32.

Next, at step S3, the process program generating computer 30 generates CAD data, punch press CAM data (NC program for the punch press) and press brake CAM data (NC program for the press brake) based on the inputted drawing data.

Then, at step S5, images (or picture displays) for displaying information such as measurement sites (measurement dimensions), measurement reference values, allowable errors, measurement method and measurement devices to be used for inspecting a product are prepared. The operations for preparing, the images are carried out in the control room 31 by an inspector using either the data control computer 34 or the process generating computer 30. Examples of the image are shown FIGS. 4 and 6, in which the measurement sites or dimensions of a product image W are indicated by the letters A, B, C, D, E, F, G and their associated arrows. Further, the images may include information indicating which measurement device is to be used (not shown in the drawings). Further, the measurement reference values (which are the theoretical measurement values of an ideal product), the allowable errors (which are the errors allowable for the difference between the measurement data and the theoretical measurement values, are displayed numerically (not shown in the drawings) at appropriate positions on the screen, for example, of the display apparatus 36.

At step S6, the punch press NC program prepared at step S3 is sent to the terminal 12, whereupon the punch press 10 is operated to carry out a punching process on a sheet metal workpiece supplied to the punch press 10 in accordance with such program.

At step S7, the image for displaying the measurement sites (or dimensions), measurement reference values, allowable errors and measurement device prepared at step S5 for the product W is displayed on the screen of the display apparatus 16 of the terminal 12. For example, in FIG. 4, the dimensions A, B, C, D are shown as the measurement dimensions or sites. Further, the measurement reference values and the allowable errors are displayed numerically (not shown in the drawings) at appropriate positions on the display apparatus 16.

At step S8, an on-site worker uses a finger, as shown in FIG. 4, to press the position of any of the dimensions A, B, C, D displayed on the touch screen 16a of the display apparatus 16 in order to select which dimension is to be measured. Namely, a particular dimension to be measured is selected by pressing the position of such dimension displayed on the touch screen 16a of the display apparatus 16. Specifically, for example, when the position of the dimension A on the touch screen 16a is pressed, a signal that indicates that measurements to be carried out is for dimension A is inputted. Further, it is possible to have the selection of the measurement sites be carried out automatically by the terminal 12. Namely, when one of the dimensions (e.g. out of the dimensions indicated by the letters A, B, C, D and their associated arrows) shown in FIG. 4 is appropriate for measurement, it is possible to arrange for the terminal 12 to either flash or change the color of that particular dimension. In this way, it is possible to automatically indicate the dimension appropriate for measurement to an on-site worker.

Then, at step S9, the on-site worker uses one of the measuring devices (e.g., the calipers) of the first measuring apparatus 14 to measure the dimension (e.g., dension A) of the product selected (either manually by the on-site worker or automatically by the terminal 12) at step S8.

At step S11, the measurement data for the dimension measured at step S9 is sent to the terminal 12 via the transmitter 14a and the receiver 12a.

At step S13, the terminal 12 compares the measurement data with the measurement reference value and the allowable error.

Then, at step S15, if the results of the comparison carried out in step S13 indicate that the measurement data exceeds the limit defined by the allowable error, the product is judged to be non-acceptable and the on-site worker is informed of such judgement, for example, by means of a particular display on the display apparatus 16 and/or a buzzer provided for the terminal 12. Further, if an on-site worker measures the wrong dimension (i.e., a dimension other than that selected for measurement), such arrangement can be used to inform the on-site worker of such mistake.

Now, in the case where the spacing C (defined as dimension C) between punched holes is to be measured, it is difficult for a worker to accurately carry out such measurement if it is to be done with respect to the centers of such punched holes. Accordingly, at step S8, both the dimension C and a more easily measurable spacing between the edges of the punched holes are displayed. Then, after the spacing between the edges of the punched holes are measured at step S9, such information is converted at step S13 into the spacing between the holes with respect to their centers (i.e., the dimension C). To carry out such conversion, the terminal 12 is provided with a suitable conversion means (e.g., a conversion software).

Next, at step S16, a determination is made as to whether or not all dimensions have been measured. If a "NO" determination is made, the process returns to step S8 and steps S8–S15 are repeated until all the dimensions A, B, C, D have been measured In this connection, the "YES", "NO" determinations at step S16 may be carried out automatically by the terminal 12. Namely, by having the terminal 12 manage (or control) measurements for such dimensions, it is possible to automatically supply an on-site worker or inspector with information related to the completion or incompletion of all measurements. Further, if the terminal 12 is arranged to automatically select the dimensions to be measured, as was described above (for step S8), the data in the terminal 12 will automatically be changed at step S16 to the next dimension to be measured before the process returns to step S8.

Then, when it is determined at step S16 that all dimensions have been measured, the process proceeds to step S17.

Figure 8:
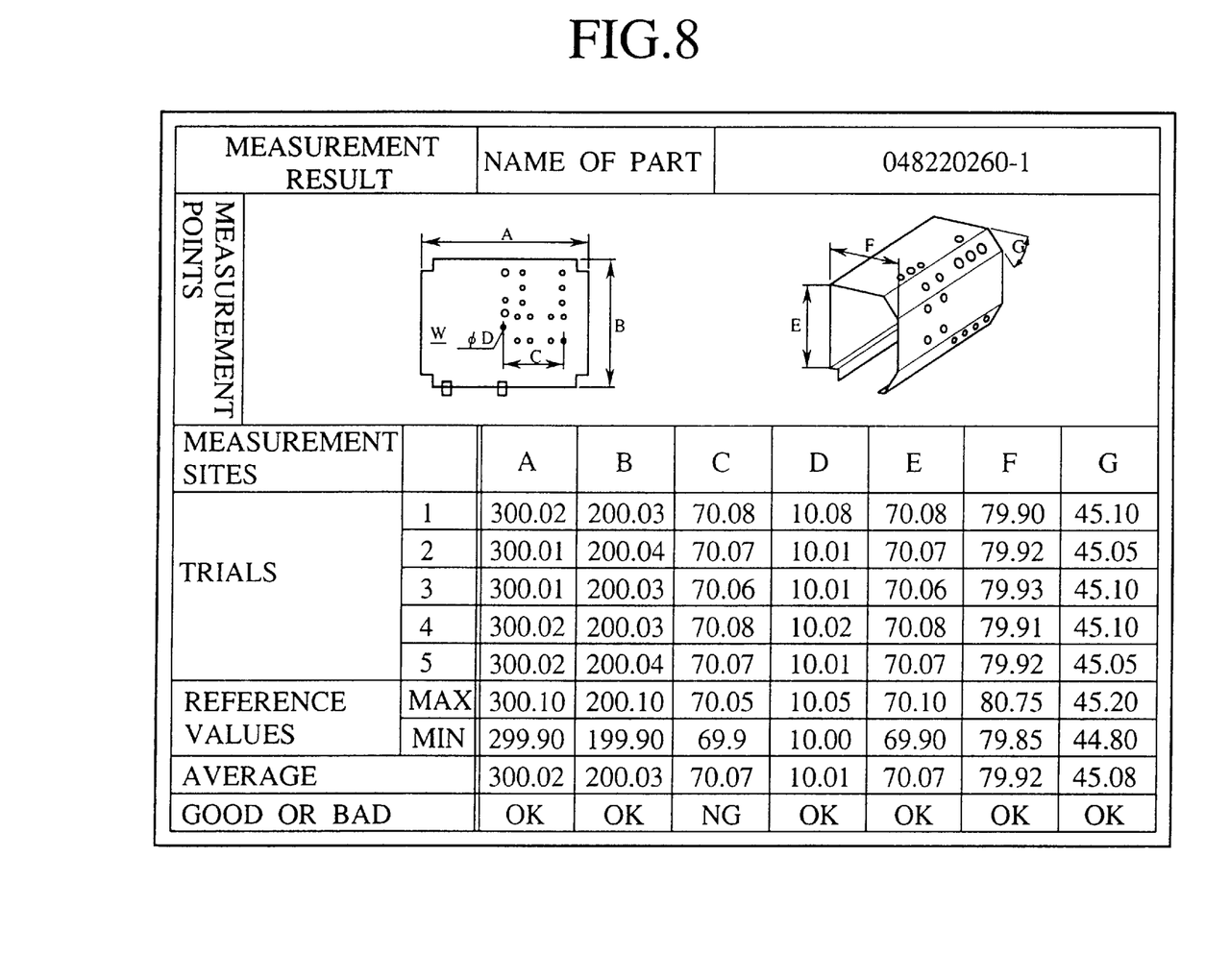
FIG. 8 is an explanatory drawing showing the display screen of a data control computer.

At step S17, the measurement data is sent to the data control computer 34. This data is then displayed on the display apparatus 36 (as shown in FIG. 8, for example) and stored in an appropriate memory.

Next, at step S18, the data control computer 34 determines whether or not each measured data lies within the limit set by its respective allowable error, and in the case where the allowable error is exceeded (i.e., a "NO" determination at step S18), such information is sent to the process program generating computer 30.

At step S19, the punch process NC program and (when necessary) the CAD data in the process program generating computer 30 is corrected in accordance with the data received from the data control computer 34. Then, the process returns to step S6 to once again carry out a punching process.

In this connection, it is to be noted that in the case where the punch press 10 is the only sheet metal processing machine in the system, the terminal 12 may be designed to carry out all the functions of the process program generating computer 30 and the data control computer 34. In such case, the operations performed in steps S3, S5, S17, S18 and S19 are also carried out by the terminal 12.

Now, in the case where it is determined at step S18 that the measurement data does not exceed the limits set by the allowable errors (i.e., a "YES" determination at step S18), the process proceeds to step S20.

At step S20, a bending process is carried out with the press brake 20 in accordance with the CAM data (i.e. press brake NC program) generated at step S3.

Next, at step S21, image for showing the measurement sites (or measurement dimensions) of the product which has undergone the bending process carried out in step S20 are displayed on the display apparatus 26 of the terminal 22. For example, as shown in FIG. 6, the image for showing the dimensions E, F, G to be measured are displayed on the display apparatus 26.

Figure 6:
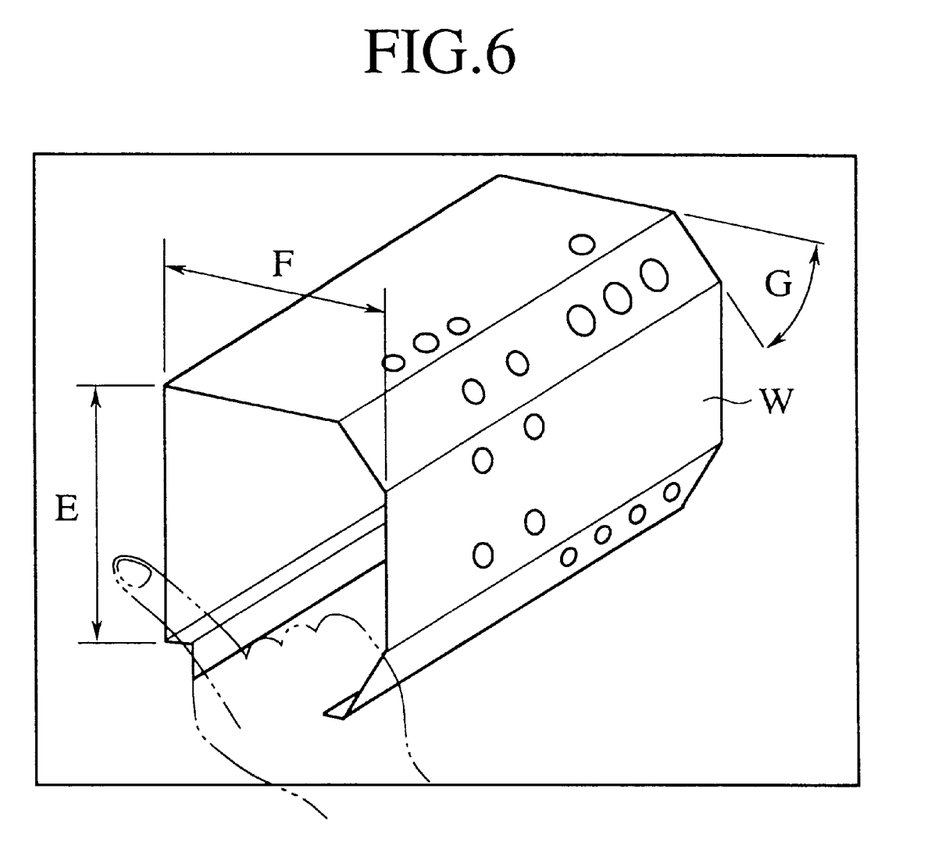
FIG. 6 is an explanatory drawing showing the display screen of a press brake terminal computer.

Next, at step S22, an on-site worker uses a finger, as shown in FIG. 6, to press the position of any of the dimensions E, F, G displayed on the touch screen 26a of the display apparatus 26 in order to select which dimension is to be measured. Further, in a manner similar to that described above for step S8, instead of having a worker manually select a dimension for measurement, it is possible to have the terminal 22 automatically select a dimension for measurement. In this case, when one of the dimensions (out of the dimensions indicated by the letters E, F, G in FIG. 6) is to be measured, it is possible to arrange for the terminal 22 to either flash or change the color of that particular dimension.

Figure 7:
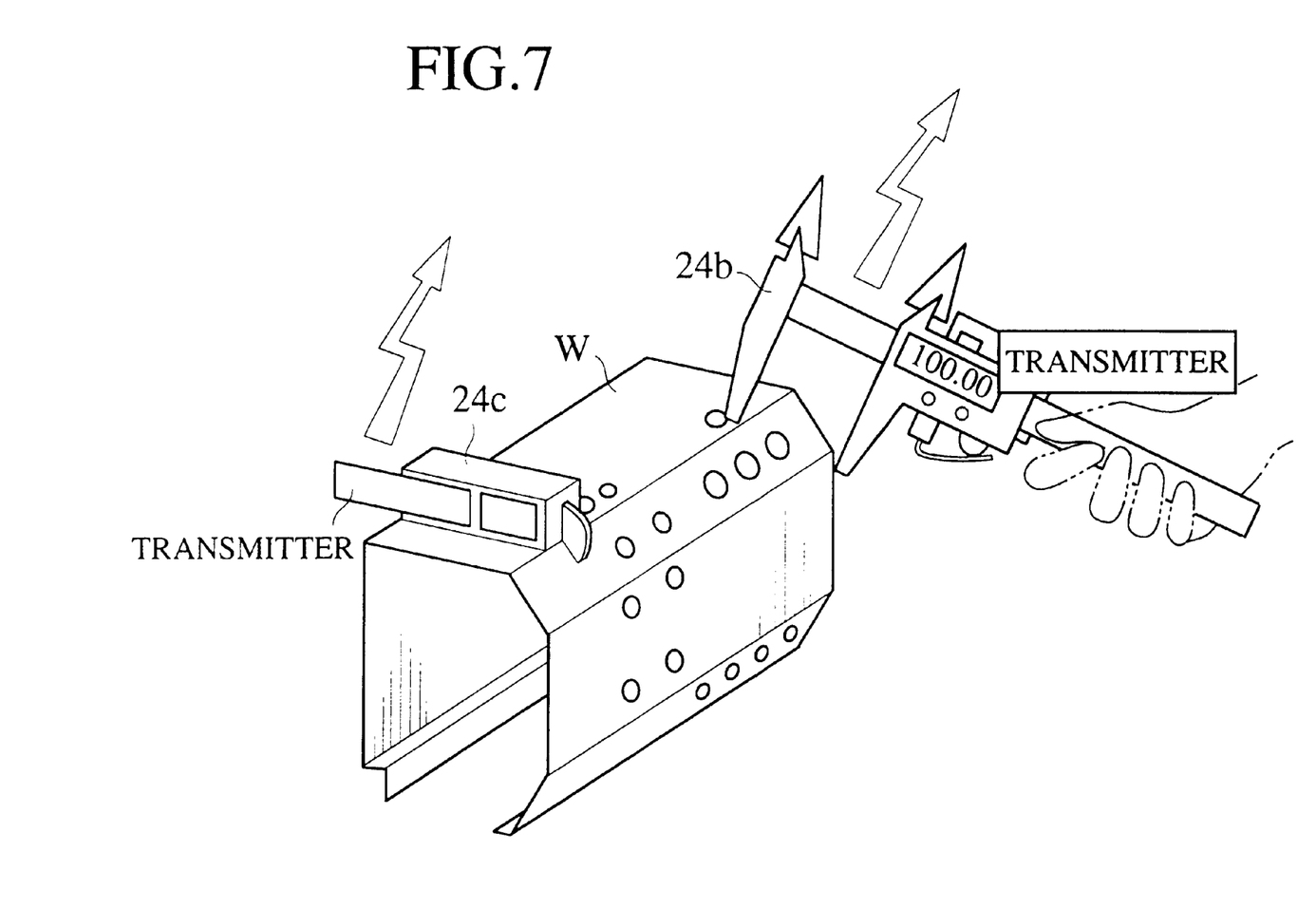
FIG. 7 is an explanatory drawing showing how a measurement is carried out for measuring dimensions of a product which has undergone a bending process.

Then, at step S23, the on-site worker uses one or more measuring devices 24 (e.g., the calipers 24b and/or the bend angle gauging device 24c as shown in FIG. 7) to measure the dimension (e.g., dimension E and F) and/or bend angle (e.g. bend angle G) selected at step S22.

Next, at step S25, the measurement data for the dimension and/or angle measured at step S23 is sent to the terminal 22 via the transmitter 24a and the receiver 22a.

Next, at step S27, the terminal 22 compares the measurement data with the measurement reference value and the allowable error.

Then, at step S29, if the results of the comparison carried out in step 27 indicate that the measurement data exceeds the limit defined by the allowable error, the product is judged to be non-acceptable and the on-site worker is informed of such judgment, for example, by means of a particular display on the display apparatus 26 and/or a buzzer provided for the terminal 22.

At step S30, a determination is made as to whether or not all dimensions have bees measured. If a "NO" determination is made, the process returns to step S22 and steps S22–S29 are repeated until all the dimensions E, F, G and all angles (such as an angle θ) have been measured.

At step S31, the measurement data is sent from the terminal 22 to the data control computer 34. This data is then displayed on the display apparatus 36 (in a manner as shown in FIG. 8, for example) and stored in an appropriate memory.

At step S33, the data control computer 34 determines whether or not each measured data lies within the limit set by its respective allowable error, and in the case where the allowable error is exceeded (i.e., a "NO" determination at step S33), such information is sent to the process program generating computer 30.

At step S35, the press brake NC program and (when necessary) the CAD data in the process program generating computer 30 is corrected in accordance with the data received from the data control computer 34. Then, the process returns to step S20 to once again carry out a bending process.

Now, if it is determined at step S33 that the measurement data lies within the limits set by the allowable errors, the process proceeds to step S37, whereupon the entire process is completed.

With the apparatus according to the embodiment described above, it is possible for even an inexperienced worker to easily select measurement sites or measurement dimensions of the products or parts. Furthermore, because the measurement data and measurement results are easily and quickly stored automatically by the measurement system according to the present invention, there is no risk of incorrect data being accidentally recorded. Moreover, because the measurement system according to the present invention automatically determines whether or not the measurement data lies within the limits set by prescribed allowable errors, the measurement system can automatically determine whether or not a measured product is acceptable.

Finally, it is to be understood that many changes and additions may be made to the embodiment described above without departing from the scope and spirit of this present invention.

The present disclosure relates to subject matter contained in Japanese Patent Application No. 8-298911 (filed on Nov. 11, 1996) which is expressly incorporated herein, by reference, in its entirety.

What is claimed is:

1. A method of measuring dimensions of a sheet metal part, comprising:

displaying an image of measurement sites of the sheet metal part on a display apparatus; and measuring the dimensions of the sheet metal part at measurement sites based on the image of the measurement sites displayed on the display apparatus.

2. The method of claim 1, further comprising:

using a measuring device to measure dimensions of the sheet metal part to obtain measurement values; and sending the measurement values to a computer via a communications path.

3. A measurement apparatus for measuring dimensions of a sheet metal part, comprising:

a computer for preparing data for measurement sites of the sheet metal part; and a display apparatus for displaying images of the measurement sites on the basis of the data from the computer.

4. The measurement apparatus of claim 3, further comprising:

measuring device for measuring the dimensions of the sheet metal part and outputting the measurement results obtained thereby; and a receiving device for receiving data from the measuring device.

5. The measurement apparatus of claim 4, wherein the measuring device comprises a transmitting device for transmitting measurement data to the receiving device.

6. The measurement apparatus of claim 4, wherein the receiving device is connected to a sheet metal processing machine terminal for controlling the operations of the sheet metal processing machine.

7. A sheet metal processing system, comprising:

a sheet metal processing machine;

a sheet metal processing machine terminal for controlling the sheet metal processing machine;

a display apparatus connected to the sheet metal processing machine terminal and adapted to display images of measurement sites for a part processed by the sheet metal processing machine;

measuring means for measuring the dimensions of a metal sheet part processed by the sheet metal processing machine; and a transmitter coupled to the measuring means, for transmitting dimensions of the part measured by the measuring means.

8. The sheet metal processing system of claim 7, wherein the terminal comprises a receiver or receiving measured dimensions sent from the transmitter.

9. The sheet metal processing system of claim 8, wherein the measuring means includes one or more measuring devices which can be selected for measuring the part processed by the sheet metal processing machine, with the selected measuring device being indicated by the display apparatus.

10. The sheet metal processing system of claim 8, wherein the terminal is equipped with a comparing device to compare measurement values with predetermined reference values.

11. A sheet metal processing system, comprising:

a first sheet metal processing machine;

first measuring means for measuring dimensions of a part processed by the first sheet metal processing machine, the first measuring means being equipped with a first transmitter for outputting the measured dimensions;

a first sheet metal processing machine terminal for controlling the operations of the first sheet metal processing machine, the first sheet metal processing machine terminal being equipped with a first receiver for receiving the measured dimensions from the first transmitter;

a second sheet metal processing machine;

second measuring means for measuring dimensions of a product processed by the second sheet metal processing machine, the second measuring means being equipped with a second transmitter for outputting the measured dimensions;

a second sheet metal processing machine terminal for controlling the operations of the second sheet metal processing machine, the second sheet metal processing machine terminal being equipped with a second receiver for receiving the measured dimensions from the second transmitter;

a data managing computer for receiving the measured dimensions from the first terminal and the second terminal to collectively manage the measured dimensions; and wherein a first set of the measured dimensions of the product processed by the first sheet metal processing machine and a second set of the measured dimensions of the product processed by the second sheet material processing machine are simultaneously displayed on a single display device.

12. The sheet metal processing system of claim 11, wherein the data managing computer is provided with a display device for collectively displaying the measured data.

13. The sheet metal processing system of claim 7, wherein the terminal determines whether or not the measured part dimensions are within limits defined by predetermined allowable errors, with the terminal outputting instructions for correcting NC data for the sheet metal processing machine when it is determined that the measured part dimensions exceed the limits defined by the allowable errors.

14. The sheet metal processing system of claim 11, wherein the terminal determines whether or not the measured dimensions are within limits defined by predetermined allowable errors, with the terminal outputting instructions for correcting NC data for the sheet metal processing machine when it is determined that the measured dimensions exceed the limits defined by the allowable errors.

* * * * *

UNITED STATES PATENT AND TRADEMARK OFFICE
CERTIFICATE OF CORRECTION

PATENT NO.    : 6,026,351
DATED         : February 12, 2000
INVENTOR(S)   : S. TAKEUCHI It is certified that error appears in the above-identified patent and that said Letters Patent is hereby corrected as shown below:

At column 9, line 38 (claim 8, line 2) of the printed patent, "or" should be ---for---.

Signed and Sealed this

Third Day of April, 2001

*Attest:*

NICHOLAS P. GODICI

*Attesting Officer*      *Acting Director of the United States Patent and Trademark Office*